United States Patent [19]

Yoneyama et al.

[11] Patent Number: 5,011,751
[45] Date of Patent: Apr. 30, 1991

[54] ELECTROCHEMICAL DEVICE

[75] Inventors: Sachiko Yoneyama, Yokohama; Toshiyuki Ohsawa, Kawasaki; Okitoshi Kimura, Tokyo; Toshiyuki Kabata, Yokohama, all of Japan

[73] Assignee: Ricoh Company, Ltd., Tokyo, Japan

[21] Appl. No.: 369,122

[22] Filed: Jun. 21, 1989

[30] Foreign Application Priority Data

Jun. 21, 1988 [JP] Japan ................................ 63-151110
Aug. 9, 1988 [JP] Japan ................................ 63-197173

[51] Int. Cl.⁵ ...................... H01M 6/18; H01M 2/16
[52] U.S. Cl. ................................ 429/192; 429/247
[58] Field of Search ............ 429/191, 192, 247, 248, 429/249, 256, 251, 252

[56] References Cited

U.S. PATENT DOCUMENTS

| | | | |
|---|---|---|---|
| 3,351,495 | 11/1967 | Larsen et al. | 429/252 |
| 3,704,174 | 11/1972 | Berger | 429/192 |
| 4,699,857 | 10/1987 | Giovannoni et al. | 429/252 |
| 4,830,939 | 5/1989 | Lee et al. | 429/192 |
| 4,844,995 | 7/1989 | Noda et al. | 429/192 |

FOREIGN PATENT DOCUMENTS 0136176  7/1985  Japan .................................... 429/41

Primary Examiner—Donald L. Walton
Attorney, Agent, or Firm—Oblon, Spivak, McClelland, Maier & Neustadt

[57] ABSTRACT

An electrochemical device is disclosed, which comprises at least a pair of electrodes; and a solid or solid-like composite electrolyte interposed therebetween, comprising substantially uniform spherical particles having no or substantially no electronic conductivity which are dispersed in the solid or solid-like composite electrolyte.

15 Claims, 1 Drawing Sheet

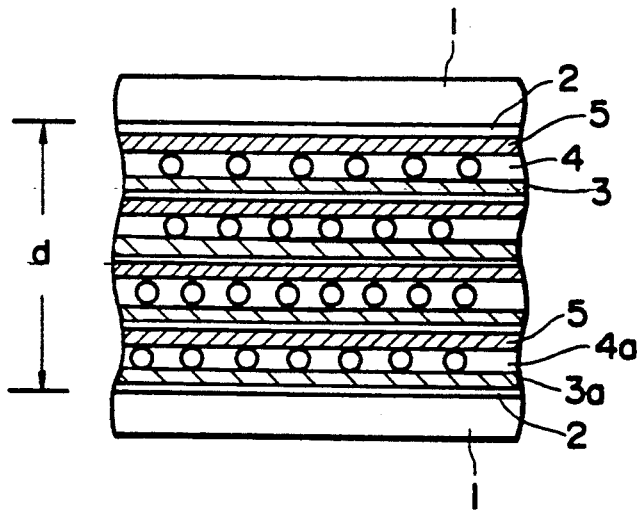

United States Patent Office

PTO – BOYERS, PA Duty Station

MISSING PAGE TEMPORARY NOTICE

PATENT # 5011,751    FOR ISSUE DATE 4-30-1991

HAS BEEN SCANNED, BUT WITH MISSING PAGE(S). UPON RECEIVING
OF MISSING PAGE(S), THE ENTIRE DOCUMENT WILL RE RESCANNED.
PLEASE CALL IMAGE DATA ADMINISTRATION STAFF OF 557-6154 IF
YOU HAVE A QUESTION. ASK FOR DAVE GROOMS, ANITA YOUNG OR
POLA JONES.

THIS NOTICE IS FOR THE MISSING PAGE CONTAINING:

DRAWING SHEET # 1

N/a at Boyers
7/30/92

Data Conversion Operation
Boyers, Pa

ELECTROCHEMICAL DEVICE

BACKGROUND OF THE INVENTION

1. Field of the Invention

The present invention relates to an electrochemical device which can be employed, for example as a battery, an electrochromic device, and a condenser.

2. Discussion of Background

Recently there is a great demand for a solidified electrochemcial device which uses an electrochemical reaction. Since conventional devices which use electrochemical reactions, such as batteries and electrochromic elements, employ an electrolyte solution, they have problems in the operational reliability as caused by the leakage and evaporation of the electrolyte solution. In order to eliminate such problems and improve the operational reliability of the devices, there have been proposed the gelation of an electrolyte solution as in Japanese Laid-Open Patent Application 62-5506 and the solidification of the same as in Japanese Laid-Open Patent Application 63-58704.

Furthermore, a polymeric solid electrolyte having high ionic conductivity has been reported in Polymer, 14, 589 (1973).

Recently polymeric solid electrolytes which do not contain a solvent are actively studied, by which the above-mentioned conventional problems are expected to be solved. However, since a gelled electrolyte lacks mechanical strength, when it is employed in a thin device, the problem of the short-circuit between electrodes is apt to occur or the device itself is broken while in use. Therefore such a gelled electrolyte is not suitable for use in thin devices.

Conventional polymeric solid electrolytes having high ionic conductivity are generally so soft that they lack self-supporting property. Therefore such polymeric solid electrolytes have the same problems as those of the gelled electrolyte. Furthermore, with respect to such polymeric solid electrolytes, it is a significant problem to be solved to make the polymeric solid electrolytes in the form of a thin film in order to reduce the internal resistance of the device.

In order to eliminate the above-mentioned problems including the short-circuit between the electrodes, it has been proposed to integrate a porous material and a filler in a solid electrolyte as disclosed, for example, in Japanese Laid-Open Patent Applications 60-195878 and 60-165058. This method, however, has the shortcoming that an electrolyte layer with a uniform thickness cannot be obtained, so that when the electrolyte layer is employed in an electrochromic device, the colors produced in the electrochromic device becomes ununiform or the operational reliability is decreased while in repeated use.

In addition to the above method, there is a method of depositing a polyethylene oxide on a substrate serving as an electrode. This method makes it possible to make the solid electrolyte sufficiently thin uniformly, but has the shortcomings that the deposition of the polyethylene oxide itself is difficult, and minute short-circuits take place when an electrolyte film having a large area is used.

With respect to batteries, a demand for a solid-like, thin battery is increasing. However, a uniformly thin electrolyte layer for use in a solid-like thin battery cannot be satisfactorily prepared by the conventional methods.

SUMMARY OF THE INVENTION

It is therefore an object of the present invention to provide an electrochemical device having high operational reliability for an extended period of time, which uses a solid or solid-like electrolyte (hereinafter referred to as a solid electrolyte).

This object of the present invention can be attained by an electrochemical device comprising (1) at least a pair of electrodes, and (2) a solid composite electrolyte interposed between the electrodes, and (3) substantially uniform spherical particles, preferably having no or substantially no electronic conductivity, which are dispersed in the solid composite electrolyte. It is preferable that the solid composite electrolyte comprise (a) a polymeric material, (b) an electrolyte salt which may contain a solvent, and (c) the uniform spherical particles dispersed in the solid composite electrolyte.

This invention is based on the discovery that the problems of the conventional polymeric solid electrolytes, when used in an electrochemical device, are caused by the non-uniformity of the thickness of a polymeric solid electrolyte layer, which will cause non-uniform application of an electric field to a pair of electrodes of the electrochemical device, and such problems can be eliminated by dispersing uniform spherical particles in the polymeric solid electrolyte. Furthermore, according to the present invention, a uniformly thin film of an electrolyte can be easily obtained.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a partial schematic cross-sectional view of an example of an electrochemical device fabricated as a secondary battery according to the present invention.

FIG. 2 is a partial schematic cross-sectional view of another example of an electrochemical device fabricated as a secondary battery according to the present invention.

FIG. 3 is a partial schematic cross-sectional view of a further example of an electrochemical device fabricated as a secondary battery according to the present invention.

FIG. 4 is a partial schematic cross-sectional view of an electrochemical device fabricated as an electrochromatic device according to the present invention.

DETAILED DESCRIPTION OF THE PREFERRED EMBODIMENTS

It is preferable that the spherical particles for use in the present invention have no or substantially no electronic conductivity, for instance, an electronic conductivity of $10^{-10}$ S/cm or less. However, the spherical particles having no or substantially no electronic conductivity may have ionic conductivity. This is because if the spherical particles have ionic conductivity, they do not hinder the movement of ions and therefore, when the spherical particles are employed in an electrochemical device, the operational characteristics of the device are not degraded. Furthermore, when the spherical particles have ionic conductivity, there is no decrease in the concentration of the carrier ions of an electrolyte salt that can be dissociated on an electrolyte layer, so that stable supply of ions becomes possible, resulting in obtaining stable characteristics of the device.

Thus the spherical particles having ionic conductivity can be advantageously employed, but spherical particles having no ionic conductivity can also be employed in the present invention.

Examples of the material of the spherical particles are plastics and glass.

Examples of the plastics include phenol resin, cross-linked divinyl benzene polymer, polymethyl methacrylate, polystyrene, nylon, polyethylene, polyethylene oxide, polypropylene oxide, copolymers of ethylene oxide and propylene oxide, and polymers including any of these copolymers as the side chains thereof; and inorganic materials such as soda-lime glass, other glass such as NASICON and LISICON, aluminum oxide and titanium dioxide.

It is preferable that the spherical particles be porous to the extent that the particles can retain the spherical shape thereof because the pores within the porous spherical particles will facilitate the ionic conduction.

When the spherical particles are employed in an electrochromic device, it is preferable that the particles be white or colorless and transparent.

Furthermore, the spherical particles have a diameter in the range of 0.1 μm to 50 μm, preferably in the range of 0.3 μm to 20 μm, more preferably in the range of 0.5 μm to 10 μm. Thus, it is preferable that the thickness of an electrolyte layer in which such spherical particles are distributed be in the range of 0.1 μm to 50 μm.

In the electrolyte layer, the above spherical particles are uniformly distributed with a number of 2,000 or less per 1 mm$^2$ depending upon the particle diameter of the particles, for example, 50 to 200 particles with a diameter of 2 to 3 μm per 1 mm$^2$.

Preferably the spherical particles have a flatness ratio of 0 to 5%, which is defined by the following formula:

$$\frac{a - b}{b} \times 100\%$$

where a is the maximum diameter of the spherical particle, and b is the minimum diameter of the spherical particle.

It is also preferable that the scatter of each diameter of the particles be in the range of ±5% or less.

The spherical particles made of a plastic can be prepared, for instance, by emulsion polymerization and suspension polymerization.

When a material such as glass is employed as the material for the spherical particles, the spherical particles can be prepared by pulverizing the material. The spherical particles can also be prepared by growing crystals, when an appropriate material is employed.

Furthermore it is preferable that the amount by volume of the spherical particles dispersed in the solid electrolyte be in the range of about 0.1 vol.% to about 50 vol.%, more preferably in the range of 1 vol.% to 20 vol.%.

The solid electrolyte for use in the present invention comprises a polymer serving as a matrix, an electrolyte salt serving as carrier, and the above-mentioned spherical particles, and has high ionic conductivity, but low electronic conductivity. The solid electrolyte may further contain an additive for promoting the ionic conduction of the electrolyte.

Examples of the additive for promoting the ionic conduction of the electrolyte include ether compounds such as polyethylene glycol, monomethoxy polyethylene glycol, dimethoxy polyethylene glycol, polypropylene glycol, dimethoxyethane, ethoxymethoxy ethane, diethoxy ethane, diethylene glycol dimethyl ether, diethylene glycol diethyl ether, diethylene glycol dibutyl ether, tetrahydrofuran and derivatives thereof; and other compounds such as propylene carbonate, ethylene carbonate, γ-butyrolactone, 1,3-dioxolan, 4-methyl-dioxolan, sulfolan, 3-methylsulfolan, dimethylformamide, and N-dimethyl-acetamide. These additives can be used alone or in combination. By the addition of any of these materials to the solid electrolyte, the ionic conduction of the polymeric solid electrolyte can be significantly increased.

The above compounds can also be employed as a solvent for preparing the solid electrolyte according to the present invention as will be explained later.

Specific examples of the polymer for the matrix are polyacrylonitrile, polyvinylidene fluoride, polyethylene oxide, polyetheylene imine, and polymers including in the main chain or side chains the following moieties:

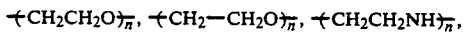

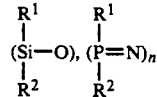

wherein $R^1$ and $R^2$ each represent a polyalkylene oxide or a polyethylene imine.

In the present invention, cross-linked polyalkylene oxide, in particular, cross-linked polyethylene oxide, is preferable for use in the solid electrolyte.

Examples of the electrolyte salt for use in the present invention are electrolytes consisting of anions such as $SCN^-$, $Cl^{31}$, $Br^-$, $I^-$, $BF_4^-$, $PF_6^-$, $AsF_6^-$, $ClO_4^-$, $SbF_6^{31}$, $CF_3SO_3^-$, and $BR_4^-$ (in which R is an alkyl group, a phenyl group or a halogen), for example, $BBu_4^-$, $B(Ph)_4^-$, and $BF_4$; and cations such as alkali metal cations, for example, $Li^+$, $Na^+$, and $K^+$, and organic cations, for example, $(C_4H_9)_4N^+$, and $(C_2H_5)_4N^+$.

The salts consisting of $BR_4^-$ in which R is an alkyl group, a phenyl group or a halogen, for example, $BBu_4^-$, $B(Ph)_4^{31}$, and $BF_4$, and counter cations, are employed as the electrolyte salts in the above-mentioned solid electrolyte, the reversible doping and dedoping properties of the electrolyte are so excellent that they can be particularly advantageously for a secondary battery.

Furthermore, generally the dissociation of electrolyte salts is largely different depending upon the kinds of the electrolyte. More specifically, when the cation of an electrolyte salt is by a different cation, even if the concentration of the electrolyte salt is the same, the concentration of the carrier ion is changed and accordingly the ionic conductivity of the salt is also changed.

With respect to the above-mentioned salts of $BR_4^-$, in order to maximize the ionic conductivity of the solid electrolyte and minimize the salt-concentration dependence of the ionic conductivity, it is preferable that the lattice energy of the electrolyte salts be 750 kJ/mol or less.

Furthermore, when the above salts are employed in a secondary battery, it is preferable that the concentration of each salt be such that the electrolyte salt concentration per ion-dissociation group, which is defined by the ratio of the number of the salt molecules to the total number of the repletion units of a polymer matrix and the molecules of a solvent when employed in the solid electrolyte, be 0.04 or more, since the concentration of the salt have a significant effect on the energy capacity of a battery and when the salt is contained at the above-mentioned concentration, the dopants can be constantly supplied to the electrode with high concentration.

The above preferable conditions with respect to the salts of $BR_4^-$ apply not only to a secondary battery, but also to an electrochromic device and other electrochemical devices.

A solid electrolyte in which uniform spherical particles are dispersed can be prepared, for example, as follows:

An electrolyte salt and the spherical particles are added to a polymerizable material such as an acryl monomer, or an epoxy monomer, which can be polymerized by the application of electron beam, light or heat thereto, and dissolved in a solvent which has been mentioned as the additive for promoting the ionic conduction of the electrolyte, together with a radical generation agent, and uniformly ispersed. The thus prepared dispersion is applied to a substrate to form a film-shaped layer on the substrate, and exposed to electron beam, light or heat to polymerize the film-shaped layer, thereby forming a sheetshaped solid electrolyte. Depending upon the degree of the polymerization, the sheet-shaped electrolyte can be made a jel-like electrolyte sheet.

Alternatively, an electrolyte salt is added to a polymerizable material dissolved in a solvent, together with a radical generator to form a reaction mixture. This reaction mixture is polymerized, for instance, by the application of electron beam, light or heat, to form a polymeric solid electrolyte. When the thus prepared polymeric electrolyte contains such a polymer as polyethylene oxide, the polymeric electrolyte is dissolved in an organic solvent to form a solution. To this solution, the spherical particles are dispersed uniformly to prepare a dispersion. This dispersion is applied to a substrate to form a film-shaped layer on the substrate, and dried, whereby a sheet-shaped solid or solid-like electrolyte is prepared on the substrate.

When the above prepared polymeric solid electrolyte is further cross-linked or modified, cross-linkable functional groups are introduced into the polymeric solid electrolyte by a conventional method, or the polymeric solid electrolyte is added to a cross-linkable material together with a crosslinking agent. Such cross-linking or modification can be carried out either in the course of forming the abovementioned electrolyte film on the substrate, or after the formation of the electrolyte film.

An electrochemical device according to the present invention can be fabricated by using the above-mentioned solid electrolyte in which the uniform spherical particles are dispersed, in combination with a pair of electrodes in which an electroconductive polymer is used as active material.

The above electrodes can be made of chromic materials such as tungstic acid, inorganic materials for use in the electrodes for batteries, such as manganese dioxide, titanium disulfide, and lithium; or organic materials such as electroconductive polymeric materials.

A solid electrolyte in which the uniform spherical particles are dispersed can be employed as a separator for an electrochemical device according to the present invention. When the solid or solid-like electroyte is employed as the separator, the internal impedance of the device can be decreased since the separator has ionic conductivity. In particular, when the solid or solid-like electrolyte is employed as the separator for a lithium battery, its life can be significantly prolonged because the dendrite of lithium grows much less than in the case where conventional separators are employed.

The above-mentioned electroconductive polymer can be synthesized by chemical polymerization, electrolytic polymerization and plasma polymerization.

An example of the chemical polymerization is described, for instance, in "Conducting Polymers., 105(1978)".

When the electroconductive polymer is prepared by electrolytic polymerization, a polymer can be formed with a uniform thickness on an electrolytic electrode. Therefore when a collector is used as the electrolytic electrode, the active material for the electrode, and the electrode can be prepared simultaneously. This process is very convenient for the succeeding steps for the fabrication of the electrochemical device.

An electrolytic polymerization method is described, for instance, in J. Electrochem. Soc., Vol. 130, No. 7, 1506~1509 (1983), Electrochem. Acta., Vol. 27, No. 1, 61~65 (1982), and J. Chem. Soc., Chem. Commun., 1199 (1984). In the electrolytic polymerization, a monomer is added to a solution of an electrolyte, and a pair of electrodes is immersed into the solution, or a monomer is applied to a solid electrolyte and a pair of electrodes is brought into contact with the solid electrolyte, and a voltage is applied to the pair of electrodes, thereby carrying out anodic oxidation polymerization or cathodic reduction polymerization to produce an electroconductive polymer. In the case where the electrolytic polymerization is carried out by use of a solid electrolyte instead of an electrolyte and a solvent, a composite electrochemical device of the solid electrolyte and the electroconductive polymer can be produced.

When the above electrochemical device is employed as a battery, the electroconductive polymer is doped with an anion or a cation so that electric energy is charged therein, and the charged electric energy is discharged through an external circuit when the electroconductive polymer is dedoped. When the electrochemical device according to the present invention is used a battery, since the above doping and dedoping can be carried out reversibly, the battery can be used as secondary battery. Furthermore, the solid or solid-like electrolyte for use in the present invention can be formed into a uniform, large thin film free from minute short-circuit. When it is employed in a thin-film-type battery, a uniform electric field can be applied between a pair of electrodes thereof, a thin-film-type battery having large electrodes, free from a short-circuit problem, can be effectively fabricated.

When the electrochemical device is employed as an electrochromic device, the characteristics of the electroconductive polymer of changing its color as it is doped or dedoped are utilized, and an electrochromic device having an enlarged display which is free from a minute short-circuit problem can be obtained by use of the solid or solid-like electrolyte since a uniform electric field can be applied between a pair of electrodes thereof.

Examples of the above-mentioned electroconductive polymer are conductive or semiconductive polymers prepared by polymerizing pyrrole thiophene, furan, benzene, azulene, aniline, diphenylbenzidine, diphenylamine, triphenylamine or derivatives of the above monomers.

The above polymers prepared from the above monomers can form complexes in combination with an electrolytic anion upon the polymerization of the monomers. In accordance with the oxidation-reduction reaction of the complex-formed polymers, the complex-formed polymers capture anions or release anions therefrom.

Examples of ions which form complexes with the electroconductive polymers in combination therewith are $ClO_4^-$, $PF_6^-$, $AsF_6^-$, $SbF_6^-$, $BF_4^-$, p-toluene sulfonic acid anion, nitrobenzene sulfonic acid anion, complex anions such as $Fe(CN)_6^-$ and $CP(CN)_6^-$, alkali metal cations such as $Na^+$, $K^+$ and $Li^+$, ammonium cations such as $(CH_3)_4N^+$, $(C_2H_5)_4N^+$ and $(C_3H_7)_4N^+$, and Lewis acids such as $AlCl_3$, $FeCl_3$ and $CaCl_3$.

It is preferable that the dopant for the electroconductive polymer be of the same type as the ion in the solid electrolyte. Therefore in the present invention, it is preferable that the electroconductive polymer be synthesized by using the same type of dopant as the ion in the solid electrolyte to use the electroconductive polymer as an electrochemical element as it is, or the electroconductive polymer be synthesized by a dopant of a different type from the ion in the solid or solid-like electrolyte, subjected to a dedoping process, and doped with the same type of a dopant as the ion in the solid electrolyte to produce an electrochemical element. In general, there are two types of dedoping processes, chemical dedoping process and electrochemical dedoping process. In the present invention, both dedoping processes can be equally employed.

An electrode, which is an indispensable element for the electrochemical device, can be made of polyacetylene, polythiophene, poly-para-phenylene which can be doped with cations, an electroconductive polymer such as polyphenylene vinylene or polyphenylene xylene, a metal such as Li, Na, K, Ag, Zn, Al or Cu, and alloys of Li and any of Al, Mg, Si, Pb, Ga or In.

The above electroconductive polymers and metals have a function as collector. However, it is preferable to increase the collecting function by depositing on an active material of the electrode a collecting material having high electric conductivity, for example, metals such as Ni, Al, Pt and Au; alloys such as stainless steel; metal oxides such as $SnO_2$, $In_2O_3$; carbon; and polypyrrole.

The present invention will now be explained in more detail with reference to the following examples and comparative examples. These examples are given for illustration of the present invention and not intended to be limiting thereof.

EXAMPLE 1

Gold was deposited on an aluminum substrate 1 having a thickness of 10 μm to form thereon a gold layer 2 having a thickness of 1000 Å. On the gold layer 2, lithium was deposited so that a lithium layer 3a having a thickness of 1000 Å was formed thereon.

A solid electrolyte layer formation liquid was prepared by dispersing 2 g of spherical ceramic particles having an average particle size of 2 μm in 10 g of methyl ethyl ketone to prepare a dispersion, and by dissolving 10 g of polyethylene oxide triol (PEO), 0.85 g of $LiBF_4$, 0.01 g of dibutyl tin dilaurate and 0.85 g of tolylene-2,4-diisocyanate (TDI).

The above-prepared solid electrolyte layer formation liquid was sprayed on the lithium layer 3a and heated at 70° C. for 20 minutes to cross-link the polyethylene oxide triol (PEO) contained in the solid electrolyte layer formation liquid, whereby a solid electrolyte layer 4a was formed on the lithium layer 3a.

On the solid electrolyte layer 4a, a polypyrrole layer 5 having a thickness of 1,000 Å was formed by plasma polymerization.

On the polypyrrole layer 5, the gold layer 2, the lithium layer 3a, the solid electrolyte layer 4a, and the polypyrrole layer 5 are succesively overlaid as shown in FIG. 1, whereby a 12 V four-layered battery, which is an electrochemical device No. 1 according to the present invention, was fabricated.

In this battery, there is disposed no separator. The solid electrolyte consists of the cross-linked polyethylene oxide and $LiBF_4$, the lattice energy of the electrolyte is 699 kJ/mole and the electrolyte salt concentration is 0.04.

The thickness of this battery as indicated by d in FIG. 1 was measured. The battery was charged by a constant voltage of 15 V until the charged voltage amounted to a theoretical charged voltage. Thereafter, the leakage current of the battery was measured. Furthermore, this battery was subjected to a charging-and-discharging test in which charging and discharging was repeated 100 times with a current of 0.01 mA and a voltage ranging from 10 V to 15 V, whereby the discharge capacity (mA.hr/g) of the battery, measured per 1 g of the active material of the positive electrode, that is, polypyrrole, was determined. The results are shown in Table 1.

EXAMPLE 2

Aniline was polymerized by using a 1.5 N sulfuric acid aqueous solution containing aniline with a quantity of 0.5 M, and an ITO glass electrode 6 as a reaction electrode shown in FIG. 2, with a constant current of 1 $mA/cm^2$ and a quantity of electricity of 3 $C/cm^2$, whereby an electrode provided with a polyaniline layer 7 thereon as shown in FIG. 2 was prepared.

The thus prepared electrode was sufficiently washed with water and then dedoped in a 0.2 N sulfuric acid with the application of a potential of −0.4 V v.s. S.C.E. The thus dedoped electrode was then sufficiently washed with water and then doped in a propylene carbonate solution of 3.5 M of $LiBF_4$ with the application of a potential of 3.8 V in terms of the oxidation and reduction potential of Li. The doped electrode was then dried, whereby a composite electrode was prepared.

A solid electrolyte layer formation liquid was prepared by dispersing 2 g of ionic conductive spherical polyethylene glycol diacrylate polymer having an average particle size of 15 μm prepared by emulsion polymerization, in 10 g of methyl ethyl ketone to prepare a dispersion, and dissolving 10 g of polyethylene oxide triol (PEO), 0.85 g of $LiBF_4$, 0.01 g of dibutyl tin dilaurate and 0.85 g of tolylene-2,4-di-isocyanate (TDI).

The thus prepared solid electrolyte layer formation liquid was coated on the composite electrode with an applicator to form a solid electrolyte layer 4b on the composite electrode.

On the solid electrolyte layer 4b, a glass electrode consisting of a glass substrate 9 and a lithium foil layer 3b having a thickness of 10 μm formed on the glass substrate was applied in such a manner that the lithium foil layer 3b came into contact with the the solid electrolyte layer 4b, under the application of a weight of 1 kg in the direction normal to the electrode surface, and heated at 70° C. for 20 minutes in order to cross-link the polyethylene oxide triol in the solid electrolyte layer 4b, whereby a battery as shown in FIG. 2, which is an electrochemical device No. 2 according to the present invention, was fabricated.

In this battery, this is disposed no separator. The solid electrolyte consists of the cross-linked polyethylene oxide and $LiBF_4$, the lattice energy of the electrolyte is 699 kJ/mole and the electrolyte salt concentration is 0.04.

The thickness of this battery as indicated by d in FIG. 2 was measured. The battery was charged by a constant voltage of 3.7 V until the charged voltage amounted to a theoretical charged voltage. Thereafter, the leakage current of the battery was measured. Furthermore, this battery was subjected to a charging-and-discharging test in which charging and discharing was repeated 100 times with a current of 0.01 mA and a voltage ranging from 2.5 V to 3.7 V, whereby the discharge capacity mA.hr/g) of the battery, measured per 1 g of the active material of the positive electrode, that is, polyaniline, was determined. The results are shown in Table 1.

EXAMPLE 3

The same composite electrode as in Example 2 was prepared.

A solid electrolyte layer formation liquid was prepared by dispersing 2 g of "Micro Pearl SP-205" (Trademark) (copolymer consisting essentially of divinylbenzene copolymer) having an average particle size of 14 μm was dispersed in 10 g of propylene carbonate, adding thereto 0.9 g of $LIBF_4$, heating the mixture to 80° C. and adding thereto vinylidene fluoride.

The above solid electrolyte layer formation liquid was coated on the above prepared composite electrode with an applicator to form a solid electrolyte layer 4b on the composite electrode.

On the solid electrolyte layer 4b, a glass electrode consisting of a glass substrate 9 and a lithium foil layer 3b having a thickness of 10 μm formed on the glass substrate 9 was applied in such a manner that the lithium foil layer 3b came into contact with the the solid electrolyte layer 4b, under the application of a weight of 1 kg in the direction normal to the electrode surface, and heated at 80° C., whereby a battery as shown in FIG. 2, which is an electrochemical device No. 3 according to the present invention, was fabricated.

In this battery, there is disposed no separator. The solid electrolyte consists of the polyvinylidene fluoride, propylene carbonate, and $LiBF_4$, the lattice energy of the electrolyte is 699 kJ/mole and the electrolyte salt concentration is 0.04.

The thickness of this battery as indicated by d in FIG. 2 was measured. The battery was charged by a constant voltage of 3.7 V until the charged voltage amounted to a theoretical charged voltage. Thereafter, the leakage current of the battery was measured. Furthermore, this battery was subjected to a charging-and-discharging test in which charging and discharing was repeated 100 times with a current of 0.01 mA and a voltage ranging from 2.5 V to 3.7 V, whereby the discharge capacity (mA.hr/g) of the battery, measured per 1 g of the active material of the positive electrode, that is, polyaniline, was determined. The results are shown in Table 1.

EXAMPLE 4

A composite electrode was prepared in the same manner as in Example 2 except that the quantity of electricity which was caused to flow at the time of polymerization of alinine was changed from 3 $C/cm^2$ to 30 $mC/cm^2$.

A solid electrolyte layer formation liquid was prepared by dispersing 2 g of spherical ceramic particles having an average particle size of 2 μm in 10 g of a mixed solvent consisting of 7 g of propylene carbonate and 3 g of 1,2-dimethoxyethane, and adding thereto 0.9 g of $LiBF_4$ and 0.1 g of divinylbenzene serving as a gelation agent.

The thus prepared solid electrolyte layer formation liquid was coated on the above prepared composite electrode by use of an applicator and heated at 50° C. for 1 minute, whereby a solid electrolyte layer 4b was formed on the composite electrode.

On the solid electrolyte layer 4b, a lithium-deposited glass electrode consisting of a glass substrate 9 and a lithium layer 3b having a thickness of 1 μm formed on the glass substrate was applied in such a manner that the lithium layer 3b came into contact with the solid electrolyte layer 4b, and heated at 50° C. for 20 minutes to gel the solid electrolyte layer 4b, whereby a battery as shown in FIG. 2, which is an electrochemical device No. 4 according to the present invention, was fabricated.

In this battery, there is disposed no separator. The solid electrolyte consists of the propylene carbonate, 1,2-dimethoxyethane, and divinylbenzene, the lattice energy of the electrolyte is 699 kJ/mole and the electrolyte salt concentration is 0.04.

The thickness of this battery as indicated by d in FIG. 2 was measured. The battery was charged by a constant voltage of 3.7 V until the charged voltage amounted to a theoretical charged voltage. Thereafter, the leakage current of the battery was measured. Furthermore, this battery was subjected to a charging-and-discharging test in which charging and discharing was repeated 100 times with a current of 0.01 mA and a voltage ranging from 2.5 V to 3.7 V, whereby the discharge capacity (mA.hr/g) of the battery, measured per 1 g of the active material of the positive electrode, that is, polyaniline, was determined. The results are shown in Table 1.

EXAMPLE 5

A composite electrode was prepared in the same manner as in Example 2 except that the quantity of electricity which was caused to flow at the time of polymerization of alinine was changed from 3 $C/cm^2$ to 30 $mC/cm^2$.

A solid electrolyte layer formation liquid was prepared by dispersing 2 g of spherical ceramic particles having an average particle size of 2 μm in 10 g of polyethylene oxide triol (PEO) to prepare a dispersion, and dissolving therein 0.89 g of $LiBF_4$, 0.01 g of dibutyl tin dilaurate, 0.85 g of tolylene-2,4-diisocyanate (TDI), and 1.0 g of propylene carbonate.

The thus prepared solid electrolyte layer formation liquid was coated on the above prepared composite electrode by use of an applicator and heated at 70° C. for 20 minutes, thereby cross-linking the polyethylene oxide triol (PEO), whereby a solid electrolyte layer 14 was formed on the composite electrode.

On the surface of the solid electrolyte layer 4b, opposite to the polyaniline electrode, lithium was deposited with a thickness of 1 μm, whereby a battery which is an electrochemical device No. 5 according to the present invention was fabricated.

In this battery, there is disposed no separator. The solid electrolyte consists of the cross-linked polyethylene oxide, propylene carbonate, and $LiBF_4$, the lattice energy of the electrolyte is 699 kJ/mole and the electrolyte salt concentration is 0.1.

The thickness of this battery as indicated by d in FIG. 2 was measured. The battery was charged by a constant voltage of 3.7 V until the charged voltage amounted to a theoretical charged voltage. Thereafter, the leakage current of the battery was measured. Furthermore, this battery was subjected to a charging-and-discharging test in which charging and discharging was repeated 100 times with a current of 0.01 mA and a voltage ranging from 2.5 V to 3.7 V, whereby the discharge capacity (mA.hr/g) of the battery, measured per 1 g of the active material of the positive electrode, that is, polyaniline, was determined. The results are shown in Table 1.

EXAMPLE 6

A composite electrode was prepared in the same manner as in Example 2 except that the quantity of electricity which was caused to flow at the time of polymerization of alinine was changed from 3 $C/cm^2$ to 30 $mC/cm^2$.

A solid electrolyte layer formation liquid was prepared by dispersing 2 g of spherical ceramic particles having an average particle size of 2 μm in 10 g of polyethylene oxide triol (PEO) to prepare a dispersion, and dissolving therein 2.8 g of $LiB(Ph)_4$, 0.01 g of dibutyl tin dilaurate, 0.85 g of tolylene-2,4-diisocyanate (TDI), and 1.0 g of propylene carbonate.

The thus prepared solid electrolyte layer formation liquid was coated on the above prepared composite electrode by use of an applicator and heated at 70° C. for 20 minutes, thereby cross-linking the polyethylene oxide triol (PEO), whereby a solid electrolyte layer 4b was formed on the composite electrode.

On the surface of the solid electrolyte layer 4b, opposite to the polyaniline electrode, lithium was deposited with a thickness of 1 μm, whereby a battery which is an electrochemical device No. 6 according to the present invention was fabricated.

In this battery, there is disposed no separator. The solid electrolyte consists of the cross-linked polyethylene oxide, propylene carbonate, and $LiB(Ph)_4$, the lattice energy of the electrolyte is 700 kJ/mole and the electrolyte salt concentration is 0.04.

The thickness of this battery as indicated by d in FIG. 2 was measured. The battery was charged by a constant voltage of 3.7 V until the charged voltage amounted to a theoretical charged voltage. Thereafter, the leakage current of the battery was measured. Furthermore, this battery was subjected to a charging-and-discharging test in which charging and discharging was repeated 100 times with a current of 0.01 mA and a voltage ranging from 2.5 V to 3.7 V, whereby the discharge capacity (mA.hr/g) of the battery, measured per 1 g of the active material of the positive electrode, that is, polyaniline, was determined. The results are shown in Table 1.

EXAMPLE 7

A composite electrode was prepared in the same manner as in Example 2 except that the quantity of electricity which was caused to flow at the time of polymerization of alinine was changed from 3 $C/cm^2$ to 30 $mC/cm^2$.

A solid electrolyte layer formation liquid was prepared by dispersing 2 g of spherical ceramic particles having an average particle size of 2 μm in 10 g of polyethylene oxide triol (PEO) to prepare a dispersion, and dissolving therein 0.89 g of $LiBF_4$, 0.01 g of dibutyl tin dilaurate, 0.85 g of tolylene-2,4-diisocyanate (TDI), and 1.0 g of ethoxymethoxyethane.

The thus prepared solid electrolyte layer formation liquid was coated on the above-prepared composite electrode by use of an applicator and heated at 70° C. for 20 minutes, thereby cross-linking the polyethylene oxide triol (PEO), whereby a solid electrolyte layer 4b was formed on the composite electrode.

On the surface of the solid electrolyte layer 4b, opposite to the polyaniline electrode, lithium was deposited with a thickness of 1 μm, whereby a battery which is an eleotrochemical device No. 7 according to the present invention was fabricated.

In this battery, there is disposed no separator. The solid electrolyte consists of the cross-linked polyethylene oxide, ethoxymethoxyethane, and $LiBF_4$, the lattice energy of the electrolyte is 700 kJ/mole and the electrolyte salt concentration is 0.1.

The thickness of this battery as indicated by d in FIG. 2 was measured. The battery was charged by a constant voltage of 3.7 V until the charged voltage amounted to a theoretical charged voltage. Thereafter, the leakage current of the battery was measured. Furthermore, this battery was subjected to a charging-and-discharging test in which charging and discharging was repeated 100 times with a current of 0.01 mA and a voltage ranging from 2.5 V to 3.7 V, whereby the discharge capacity (mA.hr/g) of the battery, measured per 1 g of the active material of the positive electrode, that is, polyaniline, was determined. The results are shown in Table 1.

EXAMPLE 8

A cross-linked layer formation liquid was prepared by dispersing 2 g of ionic conductive spherical polyethylene glycol diacrylate polymer having an average particle size of 15 μm prepared by emulsion polymerization, in 10 g of methyl ethyl ketone to prepare a dispersion, and dissolving 10 g of polyethylene oxide triol (PEO), 0.85 g of $LiBF_4$, 0.01 g of dibutyl tin dilaurate and 0.85 g of tolylene-2,4-diisocyanate (TDI). The thus prepared cross-linked layer was applied to a substrate and heated at 70° C. for 20 minutes, whereby a cross-linked film was formed on the substrate. The thus prepared cross-linked film was peeled off the substrate and immersed in an electrolytic solution of 4.4 M $LiBF_4$ dissolved in a mixed solvent of 7 parts by weight of propylene carbonate and 3 parts by weight of dimethoxyethane.

As shown in FIG. 3, the cross-linked film 4c was applied to a composite electrode comprising an ITO glass electrode 9 and a polyaniline layer 7 thereon which is the same composite electrode as prepared in Example 2. On the cross-linked film 4c, a glass electrode consisting of an ITO glass substrate 11 and a lithium foil layer 3c having a thickness of 10 μm formed on the glass substrate, whereby a battery as shown in FIG. 3, which is an electrochemical device No. 9, was fabricated.

In this battery, the solid electrolyte consists of the cross-linked polyethylene oxide, methyl ethyl ketone, and LiBF$_4$, the lattice energy of the electrolyte is 699 kJ/mole and the electrolyte salt concentration is 0.04.

The thickness of this battery as indicated by d in FIG. 2 was measured. The battery was charged by a constant voltage of 3.7 V until the charged voltage amounted to a theoretical charged voltage. Thereafter, the leakage current of the battery was measured. Furthermore, this battery was subjected to a charging-and-discharging test in which charging and discharing was repeated 100 times with a current of 0.01 mA and a voltage ranging from 2.5 V to 3.7 V, whereby the discharge capacity (mA hr/g) of the battery, measured per 1 g of the active material of the positive electrode, that is, polyaniline, was determined. The results are shown in Table 1.

EXAMPLE 9

A dispersion consisting of a mixture of 10 parts by weight of titanium disulfide and 1 part by weight of carbon black, dispersed in toluene in such a ratio of the amount of the mixture of titanium disulfide and carbon black being 10 wt.%, was prepared.

The thus prepared dispersion was coated on an ITO glass so as to form an active material layer comprising titanium disulfide with a thickness of 1 $\mu$m on the ITO glass, whereby a composite electrode was prepared.

An electrolyte layer formation liquid was prepared by dispersing 2 g of spherical ceramic particles having an average particle size of 2 $\mu$m in 10 g of polyethylene oxide triol (PEO) to prepare a dispersion, and dissolving therein 0.89 g of LiBF$_4$, 0.01 g of dibutyl tin dilaurate, 0.85 g of tolylene-2,4-diisocyanate (TDI), and 1.0 g of propylene carbonate.

The thus prepared solid electrolyte layer formation liquid was coated on the above prepared composite electrode by use of an applicator and heated at 70° C. for 20 minutes, thereby cross-linking the polyethylene oxide triol (PEO), whereby a solid electrolyte layer 4b was formed on the composite electrode.

On the surface of the solid electrolyte layer 4b, opposite to the polyaniline electrode, lithium was deposited with a thickness of 1 $\mu$m, whereby a battery which is an electrochemical device No. 9 according to the present invention was fabricated.

In this battery, the solid electrolyte consists of the cross-linked polyethylene oxide, propylene carbonate, and LiBF$_4$, the lattice energy of the electrolyte is 699 kJ/mole and the electrolyte salt concentration is 0.1.

The thickness of this battery as indicated by d in FIG. 2 was measured. The battery was charged by a constant voltage of 3.7 V until the charged voltage amounted to a theoretical charged voltage. Thereafter, the leakage current of the battery was measured. Furthermore, this battery was subjected to a charging-and-discharging test in which charging and discharing was repeated 100 times with a current of 0.01 mA and a voltage ranging from 2.5 V to 3.7 V, whereby the discharge capacity (mA.hr/g) of the battery, measured per 1 g of the active material of the positive electrode, that is, polyaniline, was determined. The results are shown in Table 1.

EXAMPLE 10

Aniline was dissolved in a 1 M hydrochloric acid in a concentration of 0.6 M to prepare an aniline solution. Ammonium persulfate was dissoved in a 1 M hydrochloric acid in a concentration of 0.25 M. The ammonium persulfate solution was added dropwise to the aniline solution and stirred at 10° C. for 2 hours, whereby aniline was polymerized to obtain polyaniline. The thus obtained polyanine was reduced by stirring the same in a 20% methanol solution of hydrazine overnight.

An electrolyte liquid was prepared by dissolving 10 g of polyethylene oxide triol (PEO), 0.89 g of LiBF$_4$, 0.01 g of dibutyl tin dilaurate, 0.85 g of tolylene-2,4-diisocyanate (TDI), and 1.0 g of propylene carbonate in 10 g of methyl ethyl ketone. To this electrolyte liquid, 30 g of the above prepared polyaniline and 3 g of carbon black were dissolved, so that a solid electrolyte layer formation liquid was prepared.

The thus prepared solid electrolyte layer formation liquid was coated on the above prepared composite electrode by use of an applicator and heated at 70° C. for 20 minutes, whereby the polyethylene oxide triol (PEO) was cross-linked, and a solid electrolyte layer 4b was formed on the composite electrode. 3 g of "Micro Pearl SP-205" was dispersed in the above-mentioned electrolyte liquid to prepare a dispersion of "Micro Pearl SP-205". This dispersion was coated on the solid electrolyte layer 4b.

On the surface of the solid electrolyte layer 4b, opposite to the polyaniline electrode, a glass electrode consisting of a glass substrate 11 and a lithium foil layer 3 having a thickness of 30 $\mu$m formed on the glass was applied in such a manner that the lithium foil layer 3 came into contact with the solid electrolyte layer 4b under the application of a weight of 1 kg in the direction normal to the electrode surface, whereby a battery which is an electrochemical device No. 10 according to the present invention was fabricated.

In this battery, there is disposed no separator. The solid electrolyte consists of the cross-linked polyethylene oxide, and LiBF$_4$, the lattice energy of the electrolyte is 699 kJ/mole and the electrolyte salt concentration is 0.04.

The thickness of this battery as indicated by d in FIG. 2 was measured. The battery was charged by a constant voltage of 3.7 V until the charged voltage amounted to a theoretical charged voltage. Thereafter, the leakage current of the battery was measured. Furthermore, this battery was subjected to a charging-and-discharging test in which charging and discharing was repeated 100 times with a current of 0.01 mA and a voltage ranging from 2.5 V to 3.7 V, whereby the discharge capacity (mA.hr/g) of the battery, measured per 1 g of the active material of the positive electrode, that is, polyaniline, was determined. The results are shown in Table 1.

EXAMPLE 11

ITO was deposited in an area of 10 cm ×30 cm on a polyester film having a thickness of 75 $\mu$m, whereby an ITO electrode was prepared.

3-methylthiophene was polymerized on the above ITO electrode in a propylene carbonate solution of 50 mM tetrabutyl ammonium perchlorate by electrolytic polymerization at a constant current of 10 mA/cm$^2$ with a quantity of electricity of 35 mC/cm$^2$.

A solid electrolytic layer formation liquid was then prepared by dispersing 2 g of "Micro Pearl SP-214" (Trademark), which is a copolymer consisting essentially of divinylbenzene copolymer having an average particle size of 14 $\mu$m, in 10 g of methyl ethyl ketone to prepare a dispersion and dissolving therein 10 g of polyethylene oxide triol (PEO), 1.24 g of KC104, 0.01 g of dibutyl tin dilaurate, and 0.85 g of tolylene-2,4-diisocyanate TDI).

The thus prepared solid electrolytic layer formation liquid was applied to the above prepared electrode by spray coating to form a solid electrolytic layer. The coated solid electrolytic layer was heated at 70° C. for 20 minutes so that the polyethylene oxide triol (PEO) was cross-linked. Gold was deposited with a thickness of 1000 Å on the surface of the solid electrolytic layer opposite to the poly 3-methylthiophene layer, whereby an electrochromic device, which is an electrochemical device No. 11 according to the present invention, was fabricated.

The solid electrolyte in this electrochromic device consists of the cross-linked polyethylene oxide, and KClO$_4$, the lattice energy of the electrolyte is 602 kJ/mole and the electrolyte salt concentration is 0.04.

This electrochromic device was subjected to a doping and dedoping test with application of a potential of ±5.0 V to observe the changes in the color in the electrochromic device. The life of this electrochromic device was 50 doping-and-dedoping cycles or more and the time required for the color change was 30 seconds.

EXAMPLE 12

ITO was deposited in an area of 10 cm ×30 cm on a polyester film having a thickness of 75 μm, whereby an ITO electrode was prepared.

3-Methylthiophene was polymerized on the above ITO electrode in a propylene carbonate solution of 50 mM tetrabutyl ammonium perchlorate by electrolytic polymerization at a constant current of 10 mA/cm$^2$ with a quantity of electricity of 35 mC/cm$^2$.

An electrolyte liquid was then prepared by dispersing 2 g of "Micro Pearl SP-214" (Trademark), which is a copolymer consisting essentially of divinylbenzene copolymer having an average particle size of 14 μm, in 10 g of propylene carbonate to prepare a dispersion and dissolving therein 10 g of polyethylene oxide triol (PEO), 1.24 g of KC104, 0.01 g of dibutyl tin dilaurate, and 0.85 g of tolylene-2,4-diisocyanate (TDI). Thus prepared electrolyte solution was heated to 80° C. 10 g of polyvinylidene fluoride was homogeneously mixed with the electrolyte solution, whereby a solid electrolyte layer formation liquid was prepared.

The thus prepared solid electrolyte layer formation liquid was applied to the poly 3-methyl thiophene layer of the above prepared electrode by spray coating to form a solid electrolytic layer. Gold was deposited with a thickness of 1000 Å on the surface of the solid electrolytic layer opposite to the poly 3-methylthiophene layer. An ITO glass electrode was further overlaid on the gold layer and heated at 70° C. for 20 minutes so that the glass electrode was firmly fixed to the solid electrolyte layer, whereby an electrochromic device as shown in FIG. 4, which is an electrochemical device No. 12 according to the present invention, was fabricated.

The solid electrolyte in this electrochromic device consists of the cross-linked polyvinylidene fluoride, propylene carbonate and KClO$_4$, the lattice energy of the electrolyte is 602 kJ/mole and the electrolyte salt concentration is 0.04.

This electrochromic device was subjected to a doping and dedoping test with application of a potential of ±5.0 V to observe the changes in the color in the electrochromic device. The life of this electrochromic device was 50 doping-and-dedoping cycles or more and the time required for the color change was 1 second.

COMPARATIVE EXAMPLE 1

Example 1 was repeated except that the spherical ceramic particles were eliminated from the solid electrolyte layer formation liquid employed in Example 1, whereby a comparative battery, which is a comparative electrochemical device No. 1, was fabricated.

The solid electrolyte in this electrochemical device consists of the cross-linked polyethylene oxide and LiBF$_4$, the lattice energy of the electrolyte is 699 kJ/mole and the electrolyte salt concentration is 0.04.

The thickness of this battery was measured in the same manner as in Example 1. The battery was evaluated with respect to the leakage current and the charging-and-discharging properties. The results are shown in Table 1.

COMPARATIVE EXAMPLE 2

Example 2 was repeated except that the amount of LiBF$_4$ in the solid electrolyte layer formation liquid employed in Example 2 was decreased from 0.85 g to 0.43 g, whereby a comparative battery, which is a comparative electrochemical device No. 2, was fabricated.

The solid electrolyte in this electrochemical device consists of the cross-linked polyethylene oxide and LiBF$_4$, the lattice energy of the electrolyte is 699 kJ/mole and the electrolyte salt concentration is 0.02.

The thickness of this battery was measured in the same manner as in Example 1. The battery was evaluated with respect to the leakage current and the charging-and-discharging properties. The results are shown in Table 1.

COMPARATIVE EXAMPLE 3

Example 2 was repeated except that the amount of LiBF$_4$ in the solid electrolyte layer formation liquid employed in Example 2 was decreased from 0.85 g to 0.2 g, whereby a comparative battery, which is a comparative electrochemical device No. 2, was fabricated.

The solid electrolyte in this electrochemical device consists of the cross-linked polyethylene oxide and LiBH$_4$, the lattice energy of the electrolyte is 778 kJ/mole and the electrolyte salt concentration is 0.04.

The thickness of this battery was measured in the same manner as in Example 1. The battery was evaluated with respect to the leakage current and the charging-and-discharging properties. The results are shown in Table 1.

COMPARATIVE EXAMPLE 4

Example 11 was repeated except that the spherical particles ("Micro Pearl SP-214") were eliminated from the solid electrolyte layer formation liquid employed in Example 11, whereby a comparative electrochromic device, which is a comparative electrochemical device No. 4, was fabricated.

The solid electrolyte in this electrochemical device consists of the cross-linked polyethylene oxide and KClO$_4$, the lattice energy of the electrolyte is 602 kJ/mole and the electrolyte salt concentration is 0.02.

This comparative electrochromic device was subjected to a doping and dedoping test with application of a potential of ±5.0 V to observe the changes in the color in the electrochromic device. The life of this electrochromic device was 6 to 7 cycles in terms of doping-and-dedoping and the time required for the color change was 60 seconds.

TABLE 1

| | | | Evaluation of Batteries | | |
| --- | --- | --- | --- | --- | --- |
| | | | Discharge Capacity (mA·hr/g)* | | Decreasing |
| | Thickness d of Battery ($\mu$m) | Leakage Current (mA) | After 1st cycle of charging and discharging | After 100th cycle of charging and discharging | ratio (%) of charging and discharging |
| Example 1 | 10 | 0 | 116 | 99 | 15 |
| Example 2 | 40 | 0 | 112 | 88 | 21 |
| Example 3 | 37 | 0 | 120 | 110 | 10 |
| Example 4 | 3.5 | 0 | 108 | 95 | 12 |
| Example 5 | 4 | 0 | 120 | 108 | 10 |
| Example 6 | 3 | 0 | 102 | 93 | 9 |
| Example 7 | 3.5 | 0 | 125 | 113 | 10 |
| Example 8 | 29 | 0 | 138 | 109 | 15 |
| Example 9 | 7.5 | 0 | 300 | 264 | 12 |
| Example 10 | 67 | 0 | 98 | 92 | 7 |
| Comparative Example 1 | 11 | 0.01 | — | — | — |
| Comparative Example 2 | 29 | 0 | 88 | 79 | 10 |
| Comparative Example 3 | 30 | 0 | 67 | 60 | 12 |

*Discharge capacity per 1 g of active material of positive electrode

What is claimed is:

1. An electrochemical device comprising:
   at least a pair of electrodes; and
   a solid or solid-like composite electrolyte interposed therebetween, comprising uniformly spherical particles having a flatness ratio of 0–5% which are dispersed in said solid or solid-like composite electrolyte.

2. The electrochemical device as claimed in claim 1, wherein spherical particles have no or substantially no electronic conductivity.

3. The electrochemical device as claimed in claim 1, wherein said spherical particle have an electronic conductivity of $10^{-10}$ s/cm or less.

4. The electrochemical device as claimed in claim 2, wherein said spherical particles have an ionic conductive property.

5. The electrochemical device as claimed in claim 1, wherein said solid or solid-like composite electrolyte comprises a polymeric material; an electrolyte salt; and said uniform spherical particles.

6. The electrochemical device as claimed in claim 5, wherein spherical particles have no or substantially no electronic conductivity.

7. The electrochemical device as claimed in claim 5, wherein said spherical particle have an electronic conductivity of $10^{-10}$ S/cm or less.

8. The electrochemical device as claimed in claim 6, wherein said spherical particles have an ionic conductive property.

9. The electrochemical device as claimed in claim 1, wherein said spherical particles are made of a plastic material selected from the group consisting of phenol resin, cross-linked divinyl benzene polymer, polymethyl methacrylate, polystyrene, nylon, polyethylene, polyethylene oxide, polypropylene oxide, copolymers of ethylene oxide and propylene oxide, and polymers including any of these copolymers as the side chains thereof.

10. The electrochemical device as claimed in claim 1, wherein said spherical particles are made of an inorganic material selected from the group consisting of soda-lime glass, NASICON, LISICON, aluminum oxide and titanium dioxide.

11. The electrochemical device as claimed in claim 1, wherein said spherical particles have a diameter ranging from 0.1 $\mu$m to 50 $\mu$m.

12. The electrochemical device as claimed in claim 1, wherein the amount by volume of said spherical particles dispersed in said solid or solid-like composite electrolyte is in the range of about 0.1 vol.% to about 50 vol.% of said solid or solid-like composite electrolyte.

13. The electrochemical device as claimed in claim 5, wherein said electrolyte salt in said solid or solid-like electrolyte consists of an anion represented by $BR_4^-$ where R represents an alkyl group, a phenyl group or a halogen, and a counter cation, said electrolyte salt having a lattice energy of 750 kJ/mol or less, and the electrolyte salt concentration thereof is 0.04 or more in terms of the electrolyte salt concentration per ion-dissociation group thereof.

14. The electrochemical device as claimed in claim 1, wherein said electrochemical device constitutes a battery.

15. The electrochemical device as claimed in claim 1, wherein said electrochemical device constitutes an electrochromic device.

* * * * *